Figure 1:
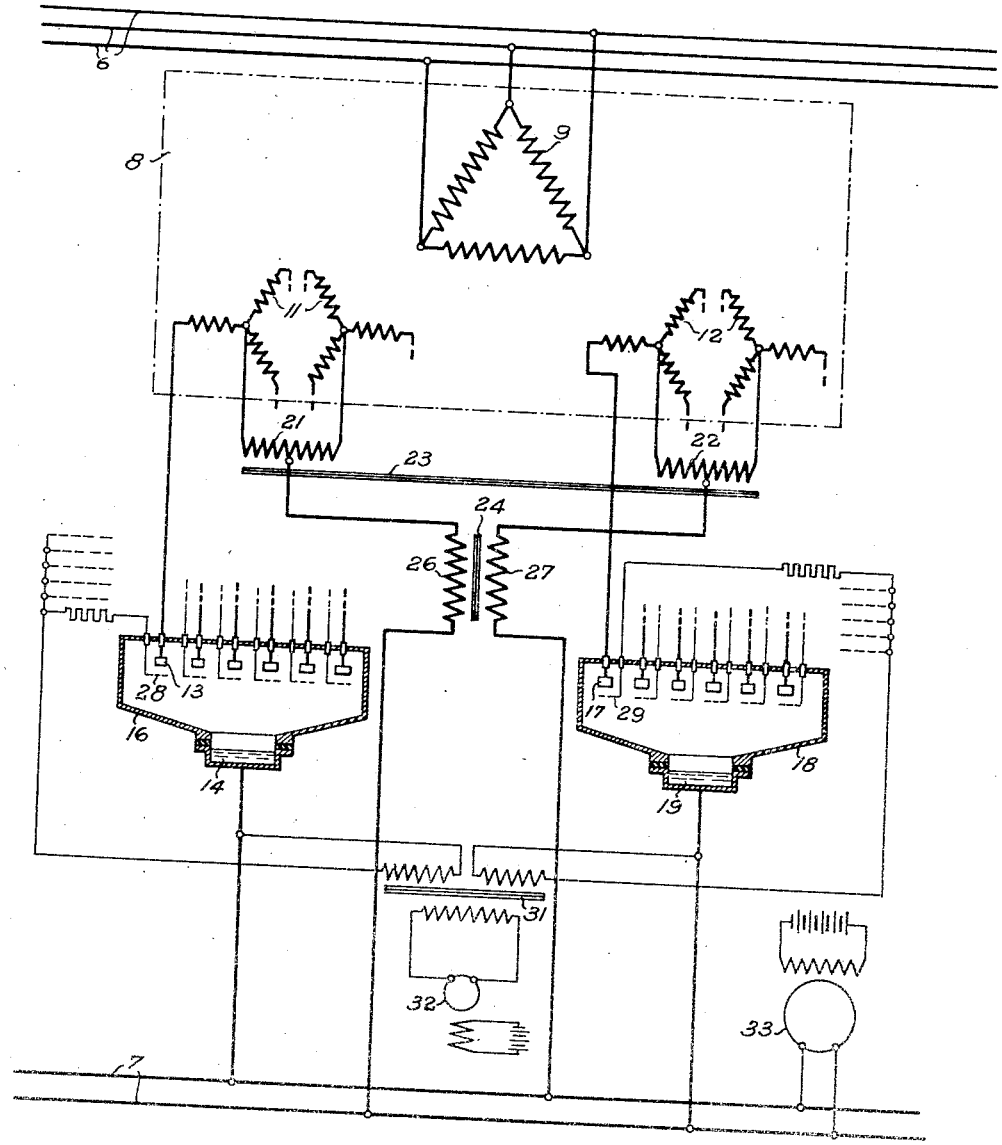

Sept. 21, 1937.  I. K. DORTORT  2,093,587
FREQUENCY CHANGING SYSTEM
Filed May 4, 1936   3 Sheets-Sheet 1

Patented Sept. 21, 1937

2,093,587

UNITED STATES PATENT OFFICE 2,093,587

FREQUENCY CHANGING SYSTEM

Isadore K. Dortort, Milwaukee, Wis., assignor to Allis-Chalmers Manufacturing Company, Milwaukee, Wis., a corporation of Delaware Application May 4, 1936, Serial No. 77,663

9 Claims. (Cl. 172—281)

This invention relates in general to improvements in electric valve frequency changing systems, and more particularly to a system for transmitting energy from a low frequency alternating current supply circuit to a high frequency alternating current load circuit.

It is well known that alternating current circuits operating at unrelated frequencies may be connected by means of frequency changing systems utilizing electric valves for the transmission of energy therebetween. Some of such systems comprise a plurality of electrical valves each having an anode and a cathode and so arranged that a large number of the valves each have cathodes at potentials different from the potentials of all other cathodes. Such arrangement precludes combining all the valves into one or into a few valve structures each having a plurality of anodes and a single cathode such as the so-called mercury arc rectifiers which are usually preferred to independent valves each having their own cathode. However, the known systems utilizing the so-called rectifiers are primarily designed to transmit energy from a polyphase alternating current supply circuit operating at one frequency, considered as high frequency, to another single phase or polyphase alternating current circuit operating at a frequency lower than that of the supply circuit and considered as low frequency. Transmission of energy from the low frequency circuit to the high frequency circuit is then possible only by providing the valves with suitable conductivity controlling means whereby each alternation of current through the output circuit is initiated only after the preceding alternation has ceased.

A simpler and more satisfactory system may be obtained by relying on the action of a load device connected with the load circuit to force the commutation of current between groups of valves of the system to thereby produce the current alternations in the output circuit, the control of the conductivity of the valves then rendering one group of valves conductive while current is still flowing through another group of valves. Means must then be provided in the connections of the system for limiting the current therethrough during commutation to prevent the flow of a short circuit current between the simultaneously conductive groups of valves. It is also advantageous to provide means for causing current to flow simultaneously through at least two valves of any group carrying current.

It is therefore one of the objects of the present invention to provide an electric valve frequency changing system utilizing valves of the multiple anode type.

Another object of the present invention is to provide an electric valve frequency changing system in which the flow of current is commutated between groups of valves by means connected with the output circuit of the system.

Another object of the present invention is to provide an electric valve frequency changing system for transmitting energy from a low frequency circuit to a high frequency circuit in which valve groups are each made conductive when the other group is carrying current.

Another object of the present invention is to provide an electric valve frequency changing system in which current is caused to flow simultaneously through at least two valves of a group of valves carrying current.

Figure 2:
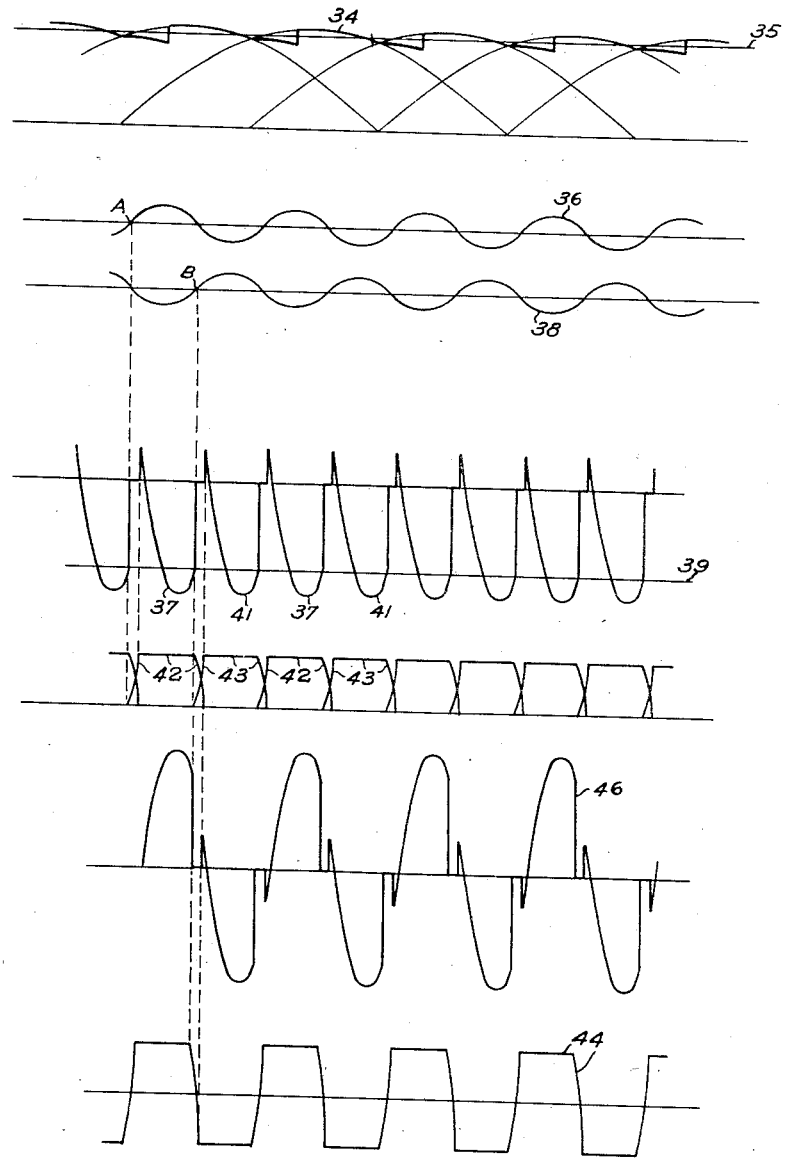
Figure 3:
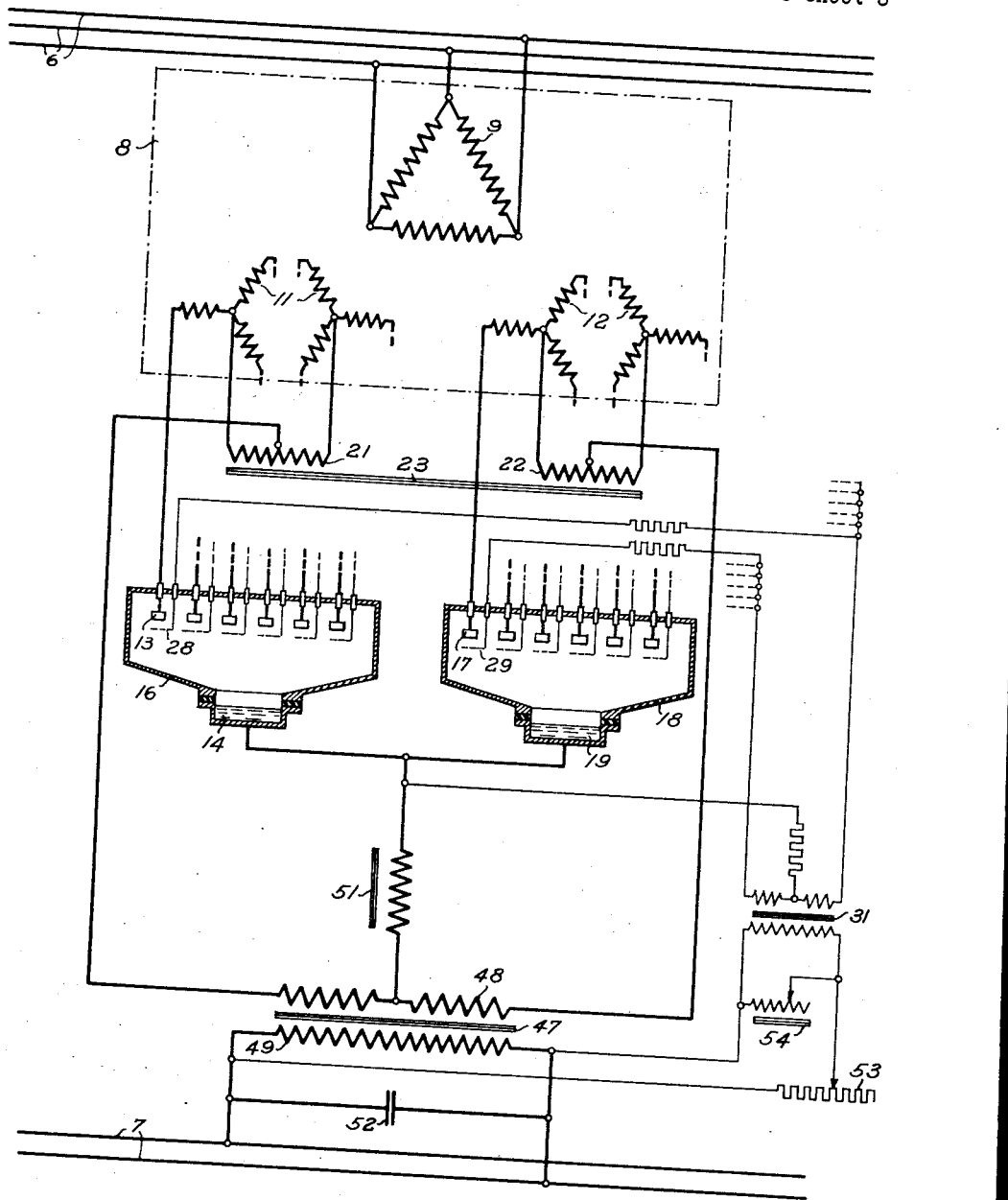

Objects and advantages other than those above set forth will be apparent from the following description when read in connection with the accompanying drawings, in which:

Fig. 1 diagrammatically illustrates one embodiment of the present arrangement for transmitting energy from a low frequency three phase alternating current circuit to a high frequency single phase alternating current circuit operating at a predetermined frequency;

Fig. 2 is a diagram illustrating the operation of the embodiment illustrated in Fig. 1; and Fig. 3 diagrammatically illustrates a modified embodiment of the present invention utilizing an output transformer for connecting the valves with the output circuit.

Referring more particularly to the drawings by characters of reference, reference numeral 6 designates an alternating current supply circuit herein illustrated as a three phase circuit energized from suitable generators (not shown) and operating at a predetermined frequency which will be herein referred to as low frequency. Circuit 6 is to supply energy to an alternating current load circuit 7 herein represented as a single phase circuit and designed to operate at a frequency materially higher than the frequency of circuit 6. For example, circuit 6 may operate at 60 cycles per second while circuit 7 is to be operated at 1000 cycles per second for supplying energy to an induction furnace. The frequency changing system comprises a supply transformer 8 having a primary winding 9 connected with circuit 6 and a pair of secondary windings 11, 12 each comprising a plurality of phase displaced sections. The sections of each secondary winding may be connected in star to form a single neutral point, but are preferably divided into a plurality of star connected groups each having a neutral point. If windings 11 and 12 are six phase windings as shown in the drawings, each winding may be divided into two three phase groups forming two neutral points, or into three single phase groups forming three neutral points.

The terminals of winding 11 are connected with the anodes 13 of a group of valves, which are preferably of the vapor type, and which may have separate cathodes each enclosed with the associated anode in a separate container, but which are preferably provided with a common cathode 14 enclosed with anodes 13 in a single container to form a unitary structure or so-called rectifier 16. Cathode 14 is connected with one of the conductors of circuit 7. In a similar manner, the terminals of winding 12 are connected with the anodes 17 of another group of valves constituting a rectifier 18 having a cathode 19 connected with the other conductor of circuit 7. The neutral points of windings 11 and 12 are connected with the conductors of circuit 7 to thereby connect winding 11 and valve 16 across circuit 7 to form a circuit for the flow of current half cycles of the one polarity, while winding 12 and valve 18 are connected across circuit 7 to form a circuit for the flow of current half cycles of the other polarity.

If windings 11 and 12 are each provided with a plurality of neutral points, the connections thereof with circuit 7 include windings 21, 22 of an interphase transformer 23, such windings being arranged about a common core in such a manner as to be closely coupled with each other. Interphase transformer 23 is provided for the purpose of forcing simultaneous flow of current through at least two valves of the particular one of the groups of valves carrying current at any instant considered. For the purpose of limiting the current in the connections of circuit 7 with transformer 8 and with the cathodes, there is provided in such connections a reactor 24 having a plurality of independent windings 26, 27 closely coupled with each other and severally inserted in series with the different groups of valves 16 and 18. Such windings are shown in Fig. 1 as being connected between the conductors of circuit 7 and windings 21, 22, but it will be apparent that they could also be connected between circuit 7 and the several cathodes. Windings 26, 27 thus receive unidirectional current impulses and are so wound on their core as to magnetize such core in the same direction, so that in general it will be advantageous to construct the core of ferrous material provided with an air gap. To simplify the explanation of the operation of the system, it will be assumed that the coupling between windings 26 and 27 is perfect.

The conductivity of valves 16 is controlled by means of a group of control electrodes 28 severally associated with anodes 13, and the conductivity of valves 18 is similarly controlled by means of a group of control electrodes 29. The two groups of control electrodes are each sequentially rendered positive and negative with respect to the potential of the cathode associated with each such group to thereby render the corresponding groups of valves conductive and non-conductive during intervals recurring at a frequency greater than the frequency of circuit 6, the two groups of valves being so controlled in alternate sequence. Such result is obtained by impressing alternating voltages between each group of control electrodes and the associated cathode by means of a control transformer 31 energized from an alternating current pilot generator 32 operating at the frequency desired for the voltage of circuit 7, which is also the frequency of the conductive intervals of the groups of valves. The current commutation between groups of valves is then caused by the presence of energy storing means, such as a synchronous motor 33, connected with circuit 7 and which maintains the voltage of such circuit during commutation. The motor and the other load devices connected with circuit 7 must however be so adjusted as to jointly receive from the system a current having a leading power factor. It will be understood that the number of phases of transformer 8 may be varied so as to be consistent with the number of phases of the supply circuit. In particular, transformer 8 may be a single phase transformer if circuit 6 is a single phase circuit. Interphase transformer 23 may be arranged to cause the simultaneous flow of current either through windings having phase portions operating alternately or through windings having portions operating in phase coincidence with each other. The simultaneous flow of current through two portions of windings 11 or 12 may also be obtained by omitting interphase transformer 23 and by replacing winding 9 by a star connected winding.

In operation, assuming circuit 6 to be energized and operating at a voltage of low frequency, winding 11 and valves 16 constitute a rectifying system capable of supplying unidirectional current to circuit 7. In the absence of control electrodes 28, such current would be a continuous current consisting of overlapping current impulses sequentially flowing through the several valves 16. In the absence of interphase transformer 23 such current impulses would be substantially consecutive and the voltage impressed on circuit 7 during the flow of such current impulses would be represented by successive portions of sine waves representing the voltages appearing across the phase sections of winding 11. When interphase transformer 23 is utilized however, the current impulses through the several valves 16 overlap by substantially one-half of their duration, so that current is generally carried by two terminals of winding 11 and the associated valve, and is even carried by three terminals of the winding and three valves during commutation of the current from one terminal to another. The output voltage of winding 11 and valves 16 may then be represented by a curve such as curve 34 in Fig. 2, which is similar to the output voltage curve, which would be obtained without the use of an interphase transformer but with circuit 6 operating at a reduced supply voltage. Line 35, of which the ordinate is equal to the average ordinate of curve 34, then represents the average voltage which may be impressed on circuit 7 through valves 16. The present explanation neglects the arc drop within the valves, which is usually not of such magnitude as to materially affect the operation of the system in its broad aspects.

In a manner similar to that above set forth, winding 12 and valves 18 are capable of impressing on circuit 7 a voltage of which the actual and the average values may be represented by curve 34 and line 35, respectively, the two groups of valves however being so connected that their output voltages are impressed on circuit 7 with opposite polarity. It is then the duty of control electrodes 28, 29 to cause the two groups of valves to alternately deliver current to circuit 7 during time intervals occurring at the frequency of the voltage of generator 32, which is higher than the frequency of the voltage of circuit 6. The voltage impressed between control electrodes 28 and cathode 14 by transformer 31 is a sinusoidal voltage having the frequency of generator 31, and may be represented by a sinusoidal curve 36.

Considering the condition of the system at a particular moment represented by point A in Fig. 2, it will be seen that at such moment control electrodes 28 become positive with respect to the potential of cathode 14, and valves 16 are accordingly rendered conductive. The two valves receiving the highest positive voltages from winding 11 then carry current, such current rising to constitute an impulse reaching a value depending on the voltage of winding 11, the back electromotive force of motor 33 and the amount of energy taken by the current consuming devices supplied from circuit 7. The electromotive force of motor 33 tends to be of sinusoidal wave shape, and as the total current supplied by the system has a leading power factor as stated above, the voltage under which the current supplied to the circuit tends to flow may be represented by a portion of a sine wave beginning a relatively short time before reversal of its polarity. Such voltage is represented in Fig. 2 by sine wave portion 37, which is represented as a negative portion because circuit 7 is receiving energy during such period. Its average value may be represented by a line 39 having a negative ordinate substantially equal to the positive ordinate of line 35.

The flow of current continues without being subjected to any control until a time represented by point B in Fig. 2, at which time control electrodes 29, which receive a voltage represented by curve 38, become positive with respect to the potential of cathode 19, while control electrodes 28 simultaneously become negative with respect to the potential of cathode 14. Control electrodes 29 thus render valves 18 conductive while valves 16 are still carrying current, and control electrodes 28 render all valves 16 non-conductive except the particular valves then carrying current, which will become non-conductive only upon interruption of the flow of current therethrough by the action of means independent of the valves. From time B on, current will flow through winding 12 and valves 18 to form a current impulse of polarity opposite to the polarity of the impulse initiated at point A, and flowing against the back electromotive force of motor 33 which force then has reversed.

If the nature of such current flow is analyzed to determine the effect thereof on the current condition in winding 9, it will be seen that the two opposite current impulses considered so far cause the flow of current of uniform polarity in winding 9 because of the symmetrical relation of windings 11 and 12 with winding 9, and such current impulses also produce a flux of uniform direction of flow in the core of reactor 24. The two current impulses may therefore be considered for the purpose of analysis as being of the same polarity. In view of the inverse connection of windings 11 and 12 with circuit 7, the counter-electromotive force of motor 33 which reverses at the end of each half cycle thereof, may also be considered as consisting of impulses opposed to the output voltage of windings 11 and 12 and valves 16 and 18 with a uniform polarity. The back electromotive force of motor 33 beginning at time B may then be represented by a negative portion of sine wave 41 similar to sine wave portion 37 but displaced by 180 degrees with respect thereto.

Curves 37 and 41 explain why the current in valves 16 is interrupted when valves 18 begin to carry current and vice versa, or in other words they explain how the current is commutated between the groups of valves. At time B the electromotive force opposed by motor 33 to winding 11, and represented by curve 37, is negative and thus opposes the flow of current between winding 11 and circuit 7. At the same moment the same electromotive force represented by curve 41, is opposed to winding 12, and is then positive, thus favoring the flow of current between winding 12 and circuit 7. The electromotive force of motor 33 thus acts as a commutating voltage which forces the commutation of current between the groups of valves by opposing the flow of current through the outgoing valves and favoring such flow in the incoming valves. Such action is however not instantaneous, so that the currents in the two groups of valves then overlap, and during such overlap the voltage impressed on circuit 7 becomes equal to the average of the voltages represented by curves 37 and 41, which average is of value zero. When the current through valves 16 has decreased to zero, valves 16 all become non-conductive as the control electrodes 28 are then negative with respect to cathode 14, and valves 18 thereafter continue to carry current alone.

During the commutation process however a closed circuit is completed from cathode 14 through winding 27, winding 22, winding 12, valves 18, winding 26, winding 21, winding 11 and valves 16 back to cathode 14, and such circuit receives the full output voltages of windings 11 and 12, i. e. twice the maximum voltage impressed on circuit 7. In the absence of means for limiting the rate of rise of the circulating current then in such closed circuit, the current therein would reach an excessive value and the operation of the system would be impossible. It is the purpose of reactor 24 to limit the rate of rise of such current to a value less than the rate of decay of the current flowing from winding 11 and valves 16 to circuit 7 and which flows, through valves 16 together with the local circulating current. The total current through valves 16 thus may decrease to zero, whereupon valves 16 regain their non-conductive condition. Such action of reactor 24 is obtained for the reason that the circulating current in the closed circuit and the load current of the system flowing through the connections of the valves and of windings 11 and 12 with line 7 magnetize the core reactor 24 in a uniform direction. The reactor therefore acts as in a direct current circuit and opposes rapid variations in the flow of current through the windings thereof, such as variations which occur during current commutation or even during the course of a complete cycle of the voltage of circuit 7. The successive current impulses flowing through valves 16 and 18 are thus rendered substantially uniform at an intensity which is also the total intensity of such current impulses during overlap therebetween. Such impulses may thus be represented by waves of substantially rectangular wave shape and of uniform polarity alternating with each other and represented by curves 42 and 43. The commutation of current from valves 16 to valves 18 and from valves 18 to valves 16 is effected by a sequence of operation similar to that above described towards the end of each half cycle of the voltage of circuit 7, the curves drawn in Fig. 2 (except curve 34) repeating themselves for each cycle of such voltage.

Considering the effect of the operation of the system on the current condition in circuit 7, the current supplied thereto may be represented by a curve 44 consisting of the substantially rectilinear peak portions of curve 42 and the peak portion of curve 43 reversed in sign joined by curves differing from the sloping portion of curves 42 and 43 by the amount of the circulating current in the local circuit. The voltage of circuit 7 may be represented by a curve 46 constituted of the successive portions of curve 37 alternating with the successive portions of curve 41 reversed in polarity. Curve 46 is a sine wave presenting recurring indentations corresponding to the periods of current commutation. The induced voltage of motor 33 is a substantially sinusoidal voltage, but such voltage is unable to prevent the presence of the indentations in the voltage curve of circuit 7 because of the reactance of the portion of circuit 7 extending between the valves and the terminals of motor 33 and of the reactance of the winding of the motor.

It will be observed that the flow of current occurs from winding 11 or winding 12, both of which operate under a substantially uniform voltage, such current being delivered to circuit 7 under a substantially sinusoidal voltage. The difference between such voltages appears across the terminals of reactor 24, such difference having a wave shape represented by curves 37 and 41 when read with respect to line 39 as axis. It will be apparent that the power factor of the current supplied to circuit 7 must be leading to permit commutation, as the commutating voltage would be of the wrong polarity at the moment of current reversal if the load current had a lagging power factor. The power factor of the load current may be varied within certain limits, the load current always being in phase with the voltage of generator 32 while the voltage of circuit 7 adjusts itself in phase with respect thereto in accordance with the joint impedance of motor 33 and of the other load devices connected with circuit 7.

In the embodiment illustrated in Fig. 3 the connections of the valves include an output transformer 47 comprising a primary winding 48 having terminals connected with the neutral points of windings 11 and 12 through windings 21 and 22 and having a neutral point connected with cathodes 14 and 19, the transformer also comprising a secondary winding 49 connected with circuit 7; transformer 47 could also be replaced by an autotransformer if so desired. Reactor 24 illustrated in Fig. 1 may again be utilized, in which case the reactor would have the windings thereof severally inserted in series with valves 16 and 18 in the connections between winding 48 and windings 21 and 22 or in separate connections between winding 48 and the cathodes. It is however preferable to utilize a reactor 51 having a single winding connected between the neutral point of winding 48 and cathodes 14 and 19. Circuit 7 may be provide with a commutating electromotive force by either a synchronous motor such as motor 33 or by a capacitor 52 which capacitor also serves inherently to give a leading power factor to the load current. Transformer 31 may again be energized as in the embodiment illustrated in Fig. 1 or may be energized from the load circuit for so controlling the conductivity of the two groups of valves as to alternately render such groups of valves conductive in synchronism with the voltage of the load circuit. The transformer 31 is then preferably connected with circuit 7 through a resistor 53 and may also be connected in parallel with a reactor 54, the magnetizing current of transformer 31 and of reactor 54 flowing through resistor 53 causing a voltage drop therein such as to cause the voltage of transformer 31 to lead the voltage of circuit 7 as in the previously described embodiment.

The operation of the present embodiment is substantially the same as that of the embodiment illustrated in Fig. 1, curves 37 and 41 then representing the voltage appearing across the single coil of reactor 51, and curve 46 representing the voltage across the primary winding 48 of transformer 47. Whereas in the embodiment illustrated in Fig. 1, during commutation, a single local circuit including valves 16 in series with valves 18 is formed for the flow of a circulating current, in the present embodiment two parallel circuits having only reactor 51 in common are offered for the simultaneous flow of separate currents through valves 16 and 18. A circulating current in such circuits results from the difference between the voltages impressed on the two halves of winding 48 by windings 11 and 12 through valves 16 and 18, such circulating current being limited by the action of reactor 51 in limiting the current in the connections of the system with circuit 7 to thereby prevent short circuits in the two groups of valves. In the present embodiment the power factor of the load current is determined by the phase angle between the voltage of circuit 7 and the voltage of transformer 31 as adjusted by means of resistor 53 and reactor 54. If the load devices connected with circuit 7 require current which is at a different power factor, the output frequency of the system varies thus changing the impedance of the load devices and of transformer 31 with reactor 54 to thereby restore the correspondence of the power factor of the load current with the adjustment of resistor 53 and reactor 54.

Although but two embodiments of the present invention have been illustrated and described, it will be apparent to those skilled in the art that various changes and modifications may be made therein without departing from the spirit of the invention or from the scope of the appended claims.

I claim:

1. An electric valve frequency changing system comprising an alternating current supply circuit operating at one frequency, a transformer having a primary winding connected with said supply circuit and a plurality of secondary windings each having a plurality of terminals and a neutral point, a plurality of groups of electric valves having anodes connected with the terminals of the secondary windings and having cathode means, an alternating current load circuit operating at a frequency higher than the supply circuit frequency and having connections with the neutral points and with the cathode means, means for controlling the conductivity of said valves to alternately render said groups of valves conductive, means connected with said load circuit for producing a commutating voltage to force the current commutation between said groups of valves, and means included in the connections with the neutral points for limiting the current in such connections during commutation of the current between said groups of valves.

2. An electric valve frequency changing system comprising an alternating current supply circuit operating at one frequency, a transformer having a primary winding connected with said supply circuit and a plurality of secondary windings each having a plurality of terminals and a neutral point, a plurality of groups of electric valves having anodes connected with the terminals of the secondary windings and having cathode means, an alternating current load circuit operating at a frequency higher than the supply circuit frequency and having connections with the neutral points and with the cathode means, means for controlling the conductivity of said valves to alternately render said groups of valves conductive, means connected with said load circuit for producing a commutating voltage to force the current comutation between said groups of valves, and a reactor included in the connections with the neutral points for rendering the total current in such connections substantially uniform during commutation of the current between said groups of valves.

3. An electric valve frequency changing system comprising an alternating current supply circuit operating at one frequency, a transformer having a primary winding connected with said supply circuit and a plurality of secondary windings each having a plurality of terminals and a neutral point, a plurality of groups of electric valves having anodes connected with the terminals of the secondary windings and having cathode means, an alternating current load circuit operating at a frequency higher than the supply circuit frequency and having connections with the neutral points and with the cathode means, means for controlling the conductivity of said valves to alternately render said groups of valves conductive, means connected with said load circuit for producing a commutating voltage to force current commutation between said groups of valves, and a reactor having independent windings closely coupled with each other and severally inserted in series with the different groups of said valves.

4. An electric valve frequency changing system comprising an alternating current supply circuit operating at one frequency, a transformer having a primary winding connected with said supply circuit and a plurality of secondary windings each having a plurality of terminals and a neutral point, a plurality of groups of electric valves having anodes connected with the terminals of the secondary windings and having cathode means, an alternating current load circuit operating at a frequency higher than the supply circuit frequency, a transformer comprising a primary winding having terminals connected with the neutral points and having a neutral point connected with the cathode means and comprising a secondary winding connected with said load circuit, means for controlling the conductivity of said valves to alternately render said groups of valves conductive, means connected with said load circuit for producing a commutating voltage to force current commutation between said groups of valves, and a reactor in the connection of the second secondary winding with the cathode means for preventing short circuits in said groups of valves during current commutation therebetween.

5. An electric valve frequency changing system comprising an alternating current supply circuit operating at one frequency, a transformer having a primary winding connected with said supply circuit and a plurality of secondary windings each having a plurality of terminals and a neutral point, a plurality of groups of electric valves having anodes connected with the terminals of the secondary windings and having cathode means, an alternating current load circuit operating at a frequency higher than the supply circuit frequency and having connections with the neutral points and with the cathode means, means for controlling the conductivity of said valves to alternately render said groups of valves conductive, means connected with said load circuit for producing a commutating voltage to force current commutation between said groups of valves, means included in the connections with the neutral points for causing simultaneous flow of current through at least two valves of any of said groups of valves carrying current, and means included in the neutral point connections for limiting the current in such connections during commutation of the current between said groups of valves.

6. An electric valve frequency changing system comprising an alternating current supply circuit operating at one frequency, a transformer having a primary winding connected with said supply circuit and a plurality of secondary windings each having a plurality of terminals and a neutral point, a plurality of groups of electric valves having anodes connected with the terminals of the secondary windings and having cathode means, an alternating current load circuit operating at a frequency higher than the supply circuit frequency and having connections with the neutral points and with the cathode means, means for controlling the conductivity of said valves to alternately render said groups of valves conductive, means connected with said load circuit for producing a commutating voltage to force current commutation between said groups of valves, interphase transformer means included in the neutral point connections for causing simultaneous flow of current through at least two terminals of any of the secondary windings carrying current and means included in the neutral point connections for limiting the current in such connections during commutation of the current between said groups of valves.

7. An electric valve frequency changing system comprising an alternating current supply circuit operating at one frequency, a transformer having a primary winding connected with said supply circuit and a plurality of secondary windings each having a plurality of terminals and a neutral point, a plurality of groups of electric valves having anodes connected with the terminals of the secondary windings and having cathode means, an alternating current load circuit operating at a frequency higher than the supply circuit frequency and having connections with the neutral points and with the cathode means, means connected with said load circuit for controlling the conductivity of said valves to alternately render said groups of valves conductive in synchronism with the voltage of said load circuit, means connected with said load circuit for producing a commutating voltage to force current commutation between said groups of valves, and means included in the neutral point connections for limiting the current in such connections during commutation of the current between said groups of valves.

8. An electric valve frequency changing system comprising an alternating current supply circuit operating at one frequency, a transformer having a primary winding connected with said supply circuit and a plurality of secondary windings each having a plurality of terminals and a neutral point, a plurality of groups of electric valves having anodes connected with the terminals of the secondary windings and having cathode means, means for controlling the conductivity of said valves to alternately render said groups of valves conductive during intervals recurring at a frequency higher than the supply circuit frequency, an alternating current load circuit having connections with the neutral points and with the cathode means and operating at the frequency of the conductive intervals of said groups of valves, means connected with said load circuit for producing a commutating voltage to force current commutation between said groups of valves, and means included in the neutral point connections for limiting the current in such connections during commutation of the current between said groups of valves.

9. An electric valve frequency changing system comprising an alternating current supply circuit operating at one frequency, an alternating current load circuit operating at a frequency higher than the supply circuit frequency, a plurality of groups of electric valves interconnecting said circuits, means for controlling the conductivity of said valves to alternately render said groups of valves conductive, and means for causing simultaneous flow of current through at least two valves of any one of said groups of valves carrying current.

ISADORE K. DORTORT.